Patented Nov. 7, 1939

2,179,215

UNITED STATES PATENT OFFICE 2,179,215

AMINO KETONES AND METHOD OF MAKING

Ralph A. Jacobson, Wilmington, Del., assignor to E. I. du Pont de Nemours & Company, Wilmington, Del., a corporation of Delaware No Drawing. Application April 22, 1936, Serial No. 75,749

21 Claims. (Cl. 260—584)

This invention relates to new compositions of matter, more particularly aminoketones, and to processes for their preparation. More specifically it relates to beta-aminoketones formed by reacting a ketone having an isopropyl group with formaldehyde and a hydrohalide of ammonia or a primary or secondary amine. These types of nitrogen compounds are referred to collectively, for the purposes of this invention, as aminonitrogen compounds having at least one hydrogen atom attached to the amino nitrogen.

This invention has as its object the preparation of new monomeric and polymeric beta-aminoketones which are useful for many purposes. Further objects and advantages will appear hereinafter.

According to this invention, a mixture of a ketone having an isopropyl group, aqueous formaldehyde and a hydrohalide of an amino-nitrogen compound of the aforesaid type is refluxed with or without stirring for several hours, the exact time depending on the amine, or until the ketone ceases to form an immiscible layer and the two original phases may substantially merge into one phase. Unchanged reactants are then removed by separating any remaining upper layer and extracting the residue with ether. The purified residue is then made alkaline with aqueous caustic alkali, the alkaline mixture again extracted with ether, and the aminoketone or ketones obtained by fractionally distilling this second extract. In many cases, as noted below, the reaction product will contain, in addition to a comparatively low-boiling monomeric beta-aminoketone, a relatively high-boiling dimer thereof and in some instances small amounts of trimers or even higher polymers.

Any ketone may be utilized according to this invention in which an isopropyl group is attached to the ketone carbonyl group, i. e., compounds of the type $RCOCH(CH_3)_2$, where R is any hydrocarbon radical; R may be, for example, an alkyl, cycloalkyl, aryl, or aralkyl group, particular examples of such groups being methyl, ethyl, isopropyl, butyl, cyclohexyl, phenyl, and benzyl.

The amino compounds used most advantageously in this invention may be represented by the general formula

where $R_1$ and $R_2$ are hydrogen or a monovalent hydrocarbon radical of any of the above-mentioned types, or in which $R_1$ and $R_2$ together form a divalent hydrocarbon radical. Thus, for example, suitable amino compounds which may be used according to this invention are ammonia, methylamine, dimethylamine, ethylamine, diethylamine, propylamine, diisopropylamine, butylamine, dibutylamine, n-dodecylamine, cyclohexylamine, dicyclohexylamine, aniline, diphenylamine, benzylamine, dibenzylamine, piperidine and the like. Other amines not coming under the above formula which are satisfactory for use in this invention are mono- and diethanolamines, amino nitriles, amino acids, and the like.

The hydrohalides of ammonia and volatile amines should ordinarily be used in the present process though the use of ammonia or the free amine is not precluded if proper precautions are taken to prevent undue loss by volatilization.

As will be evident from the examples given hereinafter, ordinary 37% aqueous formaldehyde is preferred for use in this invention, but paraformaldehyde, hexamethylenetetramine, trioxymethylene or the like can be substituted therefor if suitable solvents, such as ethanol, propanol, butanol, ethyl acetate, butyl acetate and the like, are employed.

The nature of the products which are obtained depends upon conditions of reaction and the character of the reactants. The lower boiling fractions obtained are probably beta-aminoketones formed by condensation of a ketone having an isopropyl group with aminomethanols or N-alkylaminomethanols, which are in turn formed by reaction between formaldehyde and ammonia or the amine. The probable reactions may be represented as follows, R, $R_1$, and $R_2$ having the previously given definitions:

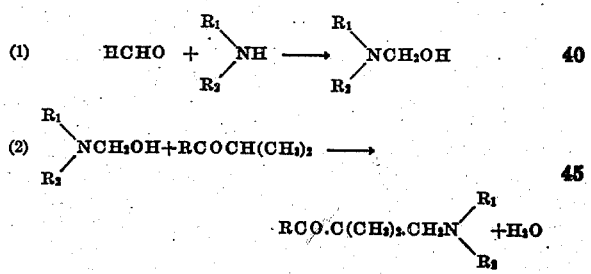

When, in the compound

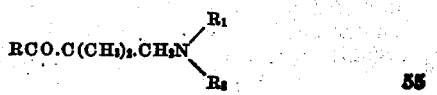

$R_1$ is hydrogen, further addition with formaldehyde may occur, as follows:

(3) $RCOC(CH_3)_2CH_2N\begin{smallmatrix}H\\ \\R_2\end{smallmatrix}$ +HCHO ⟶

$RCOC(CH_3)_2.CH_2N\begin{smallmatrix}CH_2OH\\ \\R_2\end{smallmatrix}$

In some cases, when the group R contains a sufficiently reactive hydrogen atom attached to the carbon atom alpha to the keto carbonyl group (e. g. where R is iso-propyl), the product of Equation 3 may react with that of Equation 2 to form a dimer, thus:

(4) $RCOC(CH_3)_2.CH_2N\begin{smallmatrix}CH_2OH\\ \\R_2\end{smallmatrix}$ +

$HC(CH_3)_2.COC(CH_3)_2.CH_2N\begin{smallmatrix}R_1\\ \\R_2\end{smallmatrix}$ ⟶

$RCOC(CH_3)_2CH_2N-CH_2-$
        |
        $R_2$ $C(CH_3)_2CO.C(CH_3)_2CH_2N\begin{smallmatrix}R_1\\ \\R_2\end{smallmatrix}$ +H_2O These dimers, when present in the reaction mixture, constitute fractions of considerably higher boiling points than the monomers from which they are derived, and the two may therefore be readily separated by fractional distillation.

It will be obvious from the foregoing description that dimers cannot be formed when secondary amines are used in the process, for such amines condense with formaldehyde and the ketone to form compounds of the type The invention may be illustrated by the following examples:

EXAMPLE 1.—*Condensation of diisopropyl ketone, formaldehyde, and methylamine*

A mixture of 114 grams (1 mol) of diisopropyl ketone, 135 grams (2 moles) of methylamine hydrochloride, and 300 grams (3.7 moles) of 37% aqueous formaldehyde solution was gently refluxed while stirring vigorously. The ketone at first formed an immiscible layer on the surface of the reaction mixture, but the two phases gradually merged into one over a period of ten hours refluxing. After this time, the mixture was allowed to stand for approximately three days at room temperature. It was then extracted with ether to remove unchanged diisopropyl ketone (9 grams). The residual mixture was made alkaline with 50% potassium hydroxide solution, extracted several times with ether, and the ether extract dried with magnesium sulfate and distilled. Two products were obtained boiling respectively at 80° under 18 mm. pressure (13 grams) and at 155° under 3.5 mm. pressure (111 grams). The compounds were both strongly basic and readily soluble in dilute hydrochloric acid solution. Elementary analysis of the low-boiling product showed that it had the correct nitrogen content for the $\beta$-aminoketone $(CH_3)_2CHCOC(CH_3)_2CH_2NHCH_3$ (compare Equation 2). The theoretical per cent nitrogen is 8.91% and the amount found was 9.19%. The index of refraction $N_D^{20}$ was 1.4350.

Elementary analysis of the high-boiling fraction was as follows: C, 70.08%; H, 11.67%; N, 8.93%, which corresponded closely to the cal- The low-boiling product proved to be a mixture of the aminoketones: (a)

$$(CH_3)_2CHCOC(CH_3)_2CH_2NH_2$$

and (b) $(CH_3)_2CHCOC(CH_3)_2CH_2NHCH_3$, the methyl amine necessary for the formation of (b) originating from the reaction of formaldehyde and ammonium chloride. The high-boiling product (b) was a dimer of (a) having the formula $$(CH_3)_2CHCOC(CH_3)_2CH_2NH—$$
$$CH_2C(CH_3)_2COC(CH_3)_2CH_2NH_2$$

Both (a) and (b) were strongly basic and readily soluble in dilute hydrochloric acid solution. Analysis showed that the low-boiling product (a) contained 9.41% nitrogen as compared with a theoretical nitrogen content of 9.79%, and that the high-boiling product (b) contained 8.81% nitrogen, the theoretical being 9.4%.

EXAMPLE 3.—*Repetition of Example 2 without agitation*

Example 2 was repeated except that the reaction mixture was not stirred during the course of the reaction. The low- and high-boiling reaction products which were obtained yielded the same analytical and physical data as those described in Example 2. Approximately equal proportions by weight, however, of the two products were obtained in contradistinction to a preponderant amount of high-boiling product when proceeding as described in Example 2.

EXAMPLE 4.—*Repetition of Example 1 without agitation*

Example 1 was repeated except that the reaction mixture was not stirred during the course of the reaction. Products were obtained which had the same analytical and physical data as those described in Example 1. The ratio of the low-boiling to the high-boiling reaction product was, however, 2.5:1 instead of 1:8 as was obtained in Example 1.

EXAMPLE 5.—*Condensation of diisopropyl ketone, dimethylamine hydrochloride, and formaldehyde*

A mixture of 171 grams (1.5 moles) of diisopropyl ketone, 122 grams (1.5 moles) of dimethylamine hydrochloride, and 432 grams (5.3 moles) of 37% aqueous formaldehyde solution was gently refluxed and stirred vigorously for 93½ hours. The upper layer (unreacted ketone) was separated. The lower layer was extracted with ether and the extractions added to the separated upper layer. The ether solution was dried and distilled to recover the unreacted ketone (151 grams). The remainder of the reaction mixture was made alkaline with 30% potassium hydroxide solution and extracted twice with ether. The ether extract was dried for several hours with magnesium sulfate. After removal of the ether, the crude product was fractionally distilled and yielded the following main fraction: 10 grams of a liquid boiling at 81–83° C. at 14 mm., $$N_D^{20}=1.4338$$

This product proved to be isopropyl dimethylaminomethylisopropyl ketone $$(CH_3)_2CHCOC(CH_3)_2CH_2N(CH_3)_2$$

a strongly basic compound readily soluble in dilute hydrochloric acid solution. Analysis showed that the product contained 8.06% nitrogen as compared with a theoretical nitrogen content of 8.19%. The yield was 31.8% of the theoretical, based upon the amount of diisopropyl ketone which had reacted.

EXAMPLE 6.—*Condensation of diisopropyl ketone, diethylamine hydrochloride, and formaldehyde*

A mixture of 114 grams (1 mole) of diisopropyl ketone, 73 grams (1 mole) of diethylamine, 98 grams (1 mole) of concentrated hydrochloric acid (37.5%), and 287 grams (3.5 moles) of 37% aqueous formaldehyde solution was gently refluxed and vigorously stirred for 67 hours. The upper layer (unreacted ketone) was separated. The lower layer was extracted with ether and the extractions added to the separated upper layer; this solution was dried and distilled to recover the unreacted ketone (61 g.). The remainder of the reaction mixture was made alkaline with 30% potassium hydroxide solution and extracted twice with ether. The ether extracts were combined and dried overnight with magnesium sulfate. After removal of the ether, the crude product was fractionally distilled and yielded the following main fraction: 37 grams of a liquid boiling at 100–102° C. at 12 mm., $$N_D^{20}=1.4390$$

This product proved to be diethylaminomethyl diisopropyl ketone of the formula $$(CH_3)_2CHCOC(CH_3)_2CH_2N(C_2H_5)_2$$

a strongly basic compound readily soluble in dilute aqueous hydrochloric acid. The yield of the product was 40% of the theoretical based upon the diisopropyl ketone which had reacted. Analysis showed that the product contained 7.48% nitrogen as compared with a theoretical nitrogen content of 7.04%.

EXAMPLE 7.—*Condensation of methyl isopropyl ketone, methylamine hydrochloride, and formaldehyde*

A mixture of 51 grams (0.59 mole) of methyl isopropyl ketone, 40 grams (0.59 mole) of methylamine hydrochloride, and 170 grams (2.1 moles) of 37% aqueous formaldehyde solution was refluxed gently and stirred vigorously for 8¼ hours. The homogeneous solution was extracted with ether to remove unchanged methyl isopropyl ketone (4 grams). The remainder of the reaction mixture was made alkaline with 30% potassium hydroxide solution and extracted twice with ether. The ether extracts were combined and dried overnight with magnesium sulfate. After removal of the ether, the crude product was fractionally distilled and yielded, as the main product, a liquid boiling in the range 90–111° C. at 15 mm., $$N_D^{20}\ 1.4700$$

this fraction on redistillation gave 27 grams of a beta-methylamino ketone boiling at 74–76° C. at 3 mm., $$N_D^{20}\ 1.4740$$

Analysis showed that the product contained 11.15% nitrogen as compared with a theoretical nitrogen content of 10.85% for a compound of the formula $CH_3COC(CH_3)_2CH_2NHCH_3$. The yield was 38% of the theoretical based on the methyl isopropyl ketone which had reacted. The product was strongly basic and readily soluble in dilute aqueous hydrochloric acid.

EXAMPLE 8.—*Condensation of mixed ketones (obtained as by-product from methanol synthesis), ammonium chloride, and formaldehyde*

A mixture of 500 grams (4.7 moles) of mixed ketones (consisting mainly of ethyl isopropyl and diisopropyl ketones and obtained as a by-product of the synthesis of methanol by catalytic hydrogenation of carbon oxide), 237 grams (4.4 moles) of ammonium chloride, and 1315 grams (16.2 moles) of 37% aqueous formaldehyde was gently refluxed without stirring for 56 hours. The upper layer (unreacted ketones) was separated and the lower layer extracted with ether, the extractions being added to the separated upper layer. The ether solution was distilled to recover the unreacted ketones (104 grams). The remainder of the reaction mixture was made alkaline with 30% potassium hydroxide solution and extracted twice with ether. The ether extracts were combined and dried overnight with magnesium sulfate. After removal of the ether, the crude product was fractionally distilled and yielded the following three main fractions: (a) 131 grams of a liquid boiling in the range 60–78° C. at 12 mm., (b) 92 grams of a liquid boiling in the range 78–113° C. at 12 mm., $$N_D^{20} 1.4497$$

and (c) 97 grams of a liquid boiling in the range 114–172° C. at 12.5 mm. The total weight of the fraction was 320 grams. The products were strongly basic and readily soluble in dilute hydrochloric acid solution.

The proportions of ketone, formaldehyde and amino compounds to be used in this invention may be varied over a considerable range, depending upon the products desired, the relative cost of the reactants, etc. From the considerations already set forth it is clear that, to obtain the monomeric beta-aminoketones described, at least one mole of amino compound and one mole of formaldehyde should be employed per mole of ketone. To obtain the dimeric reaction products described, an excess of formaldehyde is required, that is, the molal ratio of formaldehyde:amino compound:ketone should be at least 1.5:1:1. As will be seen from the examples, even larger excesses of formaldehyde are preferable if maximum amounts of dimer are to be obtained. An excess of amine over the theoretical 1:1 mole ratio of amine to ketone not only does no harm, but often promotes better yields by insuring the presence of sufficient aminomethanol or substituted aminomethanol to combine with all of the ketone present. The use of excess amine is particularly advantageous and important when the amine is very volatile and when it is used as such rather than as the hydrohalide. If it is desired to conserve amine rather than ketone, however, any mole ratio may be employed.

Reaction temperatures vary somewhat with the nature and proportions of the reactants, and cannot therefore be set at any arbitrary point, although as a general rule, reaction temperatures in this invention need not exceed about 100–125° C. Higher or lower temperatures may, however, be employed, particularly (in case of the former) if the reactions are carried out at super-atmospheric pressures.

The duration of the reactions described herein varies with the temperature and other conditions of the reaction. Generally the primary amine hydrohalides react much more rapidly and completely than the secondary amine hydrohalides. Thus, dimethylamine hydrochloride and diethylamine hydrochloride require a much longer period for reaction with diisopropyl ketone and formaldehyde than methylamine hydrochloride requires. A convenient general rule to follow in the case of the primary amines is to allow the reaction to proceed until all the ketone has gone into solution in the reaction mixture. With secondary amines, however, it is often necessary to separate the unreacted ketone and treat the latter with a new supply of formaldehyde and the amine. Longer reaction periods will usually increase the yields somewhat and are in no case disadvantageous.

The monomeric beta-aminoketones produced by this invention, either alone or modified with other substances, find use as plasticizers, solvents, and the like, for cellulose derivatives, especially cellulose acetate, and natural and synthetic resins, oils, fats, waxes and the like. They are particularly useful as solvents inasmuch as they combine the solvent power of both ketones and amines. They are also useful as alcohol denaturants. The high boiling dimeric products are useful as plasticizers for synthetic resins and cellulose derivatives.

The process described herein has the distinct advantage over somewhat similar processes previously proposed in that it affords a very simple and inexpensive means of providing in a pure state new and useful compositions of matter, such, particularly, as the dimeric beta-aminoketones. The process is particularly advantageous in its application to diisopropyl ketone, with which ketone it is very clear cut and gives only monomers and dimers in good yields without attendant formation of more complex polymers. Diisopropyl ketone is considered to be unique in this respect and different in kind from the ketones employed in the prior art since it is a symmetrical ketone having only one hydrogen atom on the carbon atoms adjacent to the carbonyl group. Ketones such as acetone, methyl ethyl ketone and the like have a multiplicity of alpha-hydrogen atoms on both carbons adjacent to the carbonyl group and for this reason yield a complicated mixture of polymeric products, the separation and identification of which is difficult if not impossible.

Various changes may be made in the methods hereinbefore described without departing from the invention or sacrificing any of the advantages thereof.

I claim:

1. The process of preparing amino ketones which comprises reacting a compound having the structural formula

wherein R is a hydrocarbon radicle, with formaldehyde and a compound having a single amino nitrogen atom, said atom being trivalent and attached to at least one hydrogen and otherwise joined only to hydrocarbon radicles.

2. The process of preparing amino ketones which comprises reacting a compound having the structural formula

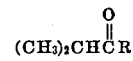

wherein R is a hydrocarbon radicle, with formaldehyde and a hydrohalide of a compound having a single amino nitrogen atom, said atom being trivalent and attached to at least one hydrogen and otherwise joined only to hydrocarbon radicles.

3. Amino ketones obtained by reacting a compound having the structural formula

wherein R is a hydrocarbon radicle, with formaldehyde and a compound having a single amino nitrogen atom, said atom being trivalent and attached to at least one hydrogen and otherwise joined only to hydrocarbon radicles.

4. Amino ketones obtained by reacting a compound having the structural formula

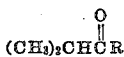

wherein R is a hydrocarbon radicle, with formaldehyde and a hydrohalide of a compound having a single amino nitrogen atom, said atom being trivalent and attached to at least one hydrogen and otherwise joined only to hydrocarbon radicles.

5. Amino ketones obtained by reacting with vigorous agitation a mixture of a compound having the structural formula

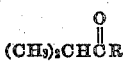

wherein R is a hydrocarbon radicle, with formaldehyde and a hydrohalide of a compound having a single amino nitrogen atom, said atom being trivalent and attached to at least one hydrogen and otherwise joined only to hydrocarbon radicles.

6. The process of preparing amino ketones which comprises reacting a compound having the structural formula

wherein R is a hydrocarbon radicle, with formaldehyde, and a substance selected from the group consisting of an amino-nitrogen-containing compound and a hydrohalide thereof, the amino-nitrogen-containing compound having a single nitrogen atom, said atom being trivalent and attached to at least one hydrogen and otherwise joined only to hydrocarbon radicles.

7. Process as set forth in claim 2, in which the reaction is carried out with vigorous agitation.

8. Process as set forth in claim 2 in which the reaction is continued with vigorous agitation until a homogeneous mixture is obtained.

9. Process as set forth in claim 2 in which the ketone is di-isopropyl ketone.

10. Process as set forth in claim 2 in which the amino-nitrogen compound is ammonia.

11. Process as set forth in claim 2, in which the amino-nitrogen compound is an amine having at least one amino-hydrogen atom.

12. The reaction products set forth in claim 4 in which the ketone is di-isopropyl ketone.

13. The reaction products set forth in claim 4 in which the amino-nitrogen compound is ammonia.

14. The reaction products set forth in claim 4 in which the amino-nitrogen compound is an amine having at least one amino-hydrogen atom.

15. Compounds having the general formula

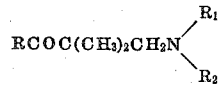

where R is a monovalent hydrocarbon radical and $R_1$ and $R_2$ are selected from the group consisting of hydrogen and monovalent hydrocarbon radicals.

16. A compound of the formula

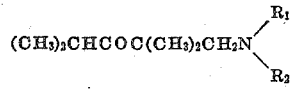

where $R_1$ and $R_2$ are radicals of the type set forth in claim 15.

17. Compounds having the general formula

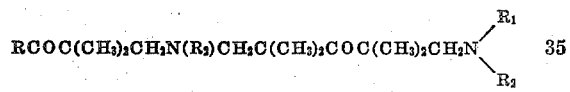

where R, $R_1$, and $R_2$ are radicals of the type set forth in claim 15.

18. A compound of the formula

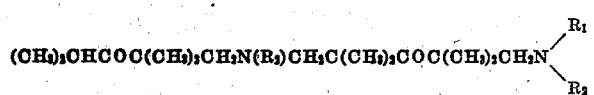

where $R_1$ and $R_2$ are radicals of the type set forth in claim 15.

19. A compound of the formula

(CH$_3$)$_2$CHCOC(CH$_3$)$_2$CH$_2$NHCH$_3$

20. A compound of the formula

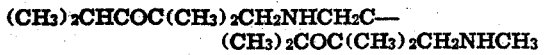

(CH$_3$)$_2$CHCOC(CH$_3$)$_2$CH$_2$NHCH$_2$C—
(CH$_3$)$_2$COC(CH$_3$)$_2$CH$_2$NHCH$_3$

21. A compound of the formula

(CH$_3$)$_2$CHCOC(CH$_3$)$_2$CH$_2$NH$_2$

RALPH A. JACOBSON.